(12) United States Patent
Banerjea et al.

(10) Patent No.: US 9,232,499 B1
(45) Date of Patent: Jan. 5, 2016

(54) COMMON CHANNELS FOR WIRELESS NETWORK ACCESS

(71) Applicant: Marvell International Ltd., Hamilton (BM)

(72) Inventors: Raja Banerjea, Sunnyvale, CA (US); Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 420 days.

(21) Appl. No.: 13/800,247

(22) Filed: Mar. 13, 2013

Related U.S. Application Data

(60) Provisional application No. 61/610,911, filed on Mar. 14, 2012.

(51) Int. Cl.
*H04W 4/00* (2009.01)
*H04W 72/02* (2009.01)
*H04L 5/00* (2006.01)
(Continued)

(52) U.S. Cl.
CPC ............. *H04W 72/02* (2013.01); *H04L 5/0069* (2013.01); *H04W 28/0226* (2013.01); *H04L 5/005* (2013.01); *H04L 5/0048* (2013.01); *H04L 5/0098* (2013.01); *H04W 48/04* (2013.01); *H04W 72/042* (2013.01); *H04W 74/002* (2013.01); *H04W 74/004* (2013.01); *H04W 74/006* (2013.01); *H04W 76/021* (2013.01);
(Continued)

(58) Field of Classification Search
CPC ..... H04L 5/0048; H04L 5/005; H04L 5/0069; H04L 5/0098; H04W 28/0226; H04W 48/04; H04W 72/02; H04W 72/042; H04W 74/002; H04W 74/004; H04W 74/006; H04W 76/021; H04W 7/022; H04W 7/025; H04W 7/026
USPC .......................... 370/329, 330, 433, 437, 480
See application file for complete search history.

(56) References Cited

U.S. PATENT DOCUMENTS

| | | | |
|---|---|---|---|
| 2004/0137905 A1* | 7/2004 | Jeong et al. | 455/450 |
| 2004/0160918 A1* | 8/2004 | Narasimha | 370/335 |

(Continued)

OTHER PUBLICATIONS

IEEE Std 802.11; IEEE Standard for Information technology—Telecommunications and information exchange between systems—Local and metropolitan area networks—Specific requirements; Part 11: Wireless LAN Medium Access Control (MAC) and Physical Layer (PHY) Specifications; (Revision of IEEE std 802.11-1999) dated Jun. 12, 2007; 1232 pages.

(Continued)

*Primary Examiner* — Peter Cheng

(57) ABSTRACT

Apparatus having corresponding methods and computer-readable media comprise: a wireless receiver configured to scan for a beacon in one or more of a first plurality of predetermined wireless channels, wherein each of the first plurality of predetermined wireless channels has the same carrier frequency in a plurality of different geographical regions; and a controller configured to identify, based on a beacon scanned by the wireless receiver in one or more of the first plurality of predetermined wireless channels, a first geographical region of the plurality of different geographical regions, wherein the controller is further configured to select a second plurality of wireless channels associated with the first geographical region, wherein the wireless receiver is further configured to scan for a beacon in one or more of the second plurality of wireless channels selected by the controller.

17 Claims, 5 Drawing Sheets

(51) Int. Cl.
*H04W 28/02* (2009.01)
*H04W 76/02* (2009.01)
*H04W 48/04* (2009.01)
*H04W 74/00* (2009.01)
*H04W 72/04* (2009.01)

(52) U.S. Cl.
CPC .......... *H04W 76/022* (2013.01); *H04W 76/025* (2013.01); *H04W 76/026* (2013.01)

(56) References Cited

U.S. PATENT DOCUMENTS

2006/0006986 A1\* 1/2006 Gravelle et al. .............. 340/10.3
2014/0185695 A1\* 7/2014 Kenney et al. ................ 375/260

OTHER PUBLICATIONS

IEEE Std P802.11af/D1.05 Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation; The Institute of Electrical and Electronics Engineers, Inc., Nov. 2011; 123 pages.

IEEE P802.11ah™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 6: Sub 1 GHz License Exempt Operation, 802.11 Working Group of the LAN/MAN Standards Committee of the IEEE Computer Society, Oct. 2013, 394 pages.

\* cited by examiner

US 9,232,499 B1

COMMON CHANNELS FOR WIRELESS NETWORK ACCESS

CROSS-REFERENCE TO RELATED APPLICATIONS

This claims the benefit of U.S. Provisional Patent Application Ser. No. 61/610,911, filed on Mar. 14, 2012, entitled "CHANNELIZATION FOR SENSOR NETWORKS," the disclosure thereof incorporated by reference herein in its entirety.

FIELD

The present disclosure relates generally to the field of wireless communication networks. More particularly, the present disclosure relates to access to such networks.

BACKGROUND

Rapid developments in the use of wireless network communications technology have necessitated the development of additional frequency bands. Such developments include technologies commonly referred to as the Internet-of-Things (IoT), Machine-to-Machine (M2M) communication, and the like, and will support sensor devices such as wireless smart meters and the like. In response, the IEEE 802.11ah standardization task group is developing a global Wireless LAN (WLAN) standard that will allow wireless access using carrier frequencies below 1 GHz in the ISM (Industrial, Scientific, and Medical) band.

One challenge with such networks results from the fragmented nature of the allocated spectrum below 1 GHz, with different countries using different portions of the band. For example, available bands below 1 GHz for use in China, the European Union, and the United States do not overlap. Such fragmentation, if not addressed, could lead to reduced deployment.

SUMMARY

In general, in one aspect, an embodiment features an apparatus comprising: a wireless receiver configured to scan for a beacon in one or more of a first plurality of predetermined wireless channels, wherein each of the first plurality of predetermined wireless channels has the same carrier frequency in a plurality of different geographical regions; and a controller configured to identify, based on a beacon scanned by the wireless receiver in one or more of the first plurality of predetermined wireless channels, a first geographical region of the plurality of different geographical regions, wherein the controller is further configured to select a second plurality of wireless channels associated with the first geographical region, wherein the wireless receiver is further configured to scan for a beacon in one or more of the second plurality of wireless channels selected by the controller.

Embodiments of the apparatus can include one or more of the following features. Some embodiments comprise a wireless transceiver, wherein the wireless transceiver comprises the wireless receiver, and a wireless transmitter, wherein the wireless transceiver is configured to communicate in one of the second plurality of wireless channels. Some embodiments comprise one or more integrated circuits comprising the apparatus. Some embodiments comprise a wireless communication device comprising the one or more integrated circuits; and a sensor configured to collect sensor data, wherein the wireless transmitter is further configured to transmit the sensor data in the one of the second plurality of wireless channels. Some embodiments comprise a wireless access point comprising: the one or more integrated circuits, wherein the controller is further configured to i) determine whether any of the first plurality of predetermined wireless channels are available, ii) establish a wireless network in one of the first plurality of predetermined wireless channels responsive to determining that no wireless network exists in the one of the first plurality of predetermined wireless channels, iii) determine whether any of the second plurality of wireless channels are available responsive to determining that none of the first plurality of predetermined wireless channels are available, and iv) establish a wireless network in one of the second plurality of wireless channels responsive to determining that no wireless network exists in the one of the second plurality of wireless channels. In some embodiments, the apparatus is compliant with all or part of IEEE standard 802.11ah, including draft and approved amendments. In some embodiments, the controller is further configured to identify the first geographical region based on a geographical region element ID contained in the beacon scanned by the wireless receiver in one or more of the first plurality of predetermined wireless channels. In some embodiments, the first plurality of predetermined wireless channels have carrier frequencies at 921 MHz, 922 MHz, and 923 MHz. In some embodiments, the second plurality of wireless channels have carrier frequencies at 920.5 MHz, 921.5 MHz, and 922.5 MHz.

In general, in one aspect, an embodiment features a method comprising: scanning for a beacon in one or more of a first plurality of predetermined wireless channels, wherein each of the first plurality of predetermined wireless channels has the same carrier frequency in a plurality of different geographical regions; based on a beacon scanned in one or more of the first plurality of predetermined wireless channels, identifying a first geographical region of the plurality of different geographical regions; selecting a second plurality of wireless channels associated with the first geographical region; and scanning for a beacon in one or more of the second plurality of wireless channels.

Embodiments of the method can include one or more of the following features. Some embodiments comprise communicating in one of the second plurality of wireless channels. Some embodiments comprise collecting sensor data; and transmitting the sensor data in the one of the second plurality of wireless channels. Some embodiments comprise determining whether any of the first plurality of predetermined wireless channels are available; establishing a wireless network in one of the first plurality of predetermined wireless channels responsive to determining that no wireless network exists in the one of the first plurality of predetermined wireless channels; determining whether any of the second plurality of wireless channels are available responsive to determining that none of the first plurality of predetermined wireless channels are available; and establishing a wireless network in one of the second plurality of wireless channels responsive to determining that no wireless network exists in the one of the second plurality of wireless channels. In some embodiments, the method is compliant with all or part of IEEE standard 802.11ah, including draft and approved amendments. In some embodiments, identifying the first geographical region comprises: identifying the first geographical region based on a geographical region element ID contained in the beacon scanned in one or more of the first plurality of predetermined wireless channels.

In general, in one aspect, an embodiment features computer-readable media embodying instructions executable by a computer to perform functions comprising: scanning for a beacon in one or more of a first plurality of predetermined wireless channels, wherein each of the first plurality of predetermined wireless channels has the same carrier frequency in a plurality of different geographical regions; based on a beacon scanned in one or more of the first plurality of predetermined wireless channels, identifying a first geographical region of the plurality of different geographical regions; selecting a second plurality of wireless channels associated with the first geographical region; and scanning for a beacon in one or more of the second plurality of wireless channels.

Embodiments of the computer-readable media can include one or more of the following features. In some embodiments, the functions further comprise: communicating in one of the second plurality of wireless channels. In some embodiments, the functions further comprise: collecting sensor data; and transmitting the sensor data in the one of the second plurality of wireless channels. In some embodiments, the functions further comprise: determining whether any of the first plurality of predetermined wireless channels are available; establishing a wireless network in one of the first plurality of predetermined wireless channels responsive to determining that no wireless network exists in the one of the first plurality of predetermined wireless channels; determining whether any of the second plurality of wireless channels are available responsive to determining that none of the first plurality of predetermined wireless channels are available; and establishing a wireless network in one of the second plurality of wireless channels responsive to determining that no wireless network exists in the one of the second plurality of wireless channels. In some embodiments, the computer-readable media is compliant with all or part of IEEE standard 802.11ah, including draft and approved amendments.

The details of one or more implementations are set forth in the accompanying drawings and the description below. Other features will be apparent from the description and drawings, and from the claims.

Figure 1:
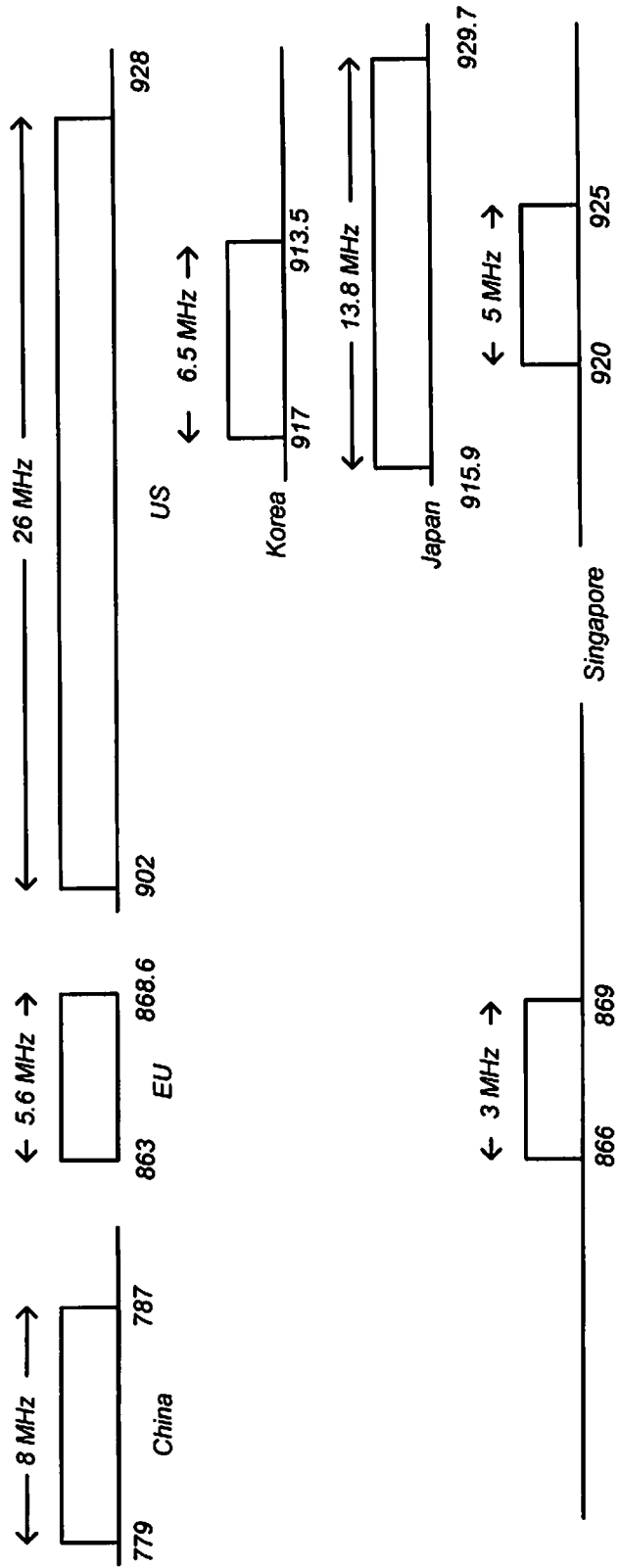
FIG. 1 illustrates the availability of the IEEE 802.11ah spectrum by geographical region.

The leading digit(s) of each reference numeral used in this specification indicates the number of the drawing in which the reference numeral first appears.

DETAILED DESCRIPTION

Embodiments of the present disclosure enable the use of common channels in fragmented frequency bands for access to wireless networks. While these embodiments are described herein in terms of IEEE 802.11ah networks, this description is also applicable to other sorts of wireless networks—e.g., IEEE 802.11af networks, and so on.

FIG. 1 illustrates the availability of the IEEE 802.11ah spectrum by geographical region. Referring to FIG. 1, the 8 MHz band spanning 779-787 MHz is allocated to China, the 5.6 MHz band spanning 863-868.6 MHz is assigned to the European Union (EU), the 26 MHz band spanning 902-928 MHz is assigned to the United States (US), the 6.5 MHz band spanning 917-923.5 MHz is assigned to the Republic of Korea, and the 13.8 MHz band spanning 915.9-929.7 MHz is assigned to Japan, while Singapore has been assigned two bands: the 3 MHz band spanning 866-869 MHz and the 5 MHz band spanning 920-925 MHz.

In FIG. 1 it can be seen that there is considerable overlap in the frequency bands assigned to certain geographical regions. For example, the bands assigned to the United States, Korea, Singapore and Japan have significant or complete overlap. According to some embodiments, common channels are assigned across these overlapping bands.

In one embodiment, channels are assigned to Korea, Japan, the United States (US) and Singapore as shown in Table 1. Of course, other assignment plans may be used instead. For example, while the bandwidth of each channel in Table 1 is 1 MHz, the IEEE 802.11ah standard permits channel bandwidths of 1, 2, 4, 8 and 16 MHz.

TABLE 1

| Region | Band (MHz) | Bandwidth (MHz) | Carrier Frequencies (MHz) | No. of Channels |
|---|---|---|---|---|
| Korea | 917.5-923.5 | 6 | 918, 919, 920, 921, 922, 923 | 6 |
| Japan | 915.9-929.7 | 13.8 | 917, 918, 919, 920, 921, 922, 923, 924, 925, 926, 927, 928 | 12 |
| US | 902-928 | 26 | 903, . . . , 921, 922, 923, . . . , 927 | 25 |
| Singapore | 920-925 | 5 | 921, 922, 923, 924 | 4 |

The channel assignment of Table 1 allows for the assignment of three common channels having respective carrier frequencies of 921, 922 and 923 MHz across the United States, Korea, Singapore and Japan. These common carrier frequencies are shown in bold in Table 1. This channelization allows for the maximum of 6 channels in Korea, but reduces the effective number of channels to 12, 25 and 4 for Japan, United States and Singapore, respectively.

In another embodiment, channels are assigned to Korea, Japan, the United States and Singapore as shown in Table 2. Of course, other assignment plans may be used instead.

TABLE 2

| Region | Band (MHz) | Bandwidth (MHz) | Carrier Frequencies (MHz) | No. of Channels |
|---|---|---|---|---|
| Korea | 917.5-923.5 | 6 | 918.5, 919.5, 920.5, 921.5, 922.5 | 5 |
| Japan | 915.9-929.7 | 13.8 | 916.5, 917.5, 918.5, 919.5, 920.5, 921.5, 922.5, 923.5, 924.5, 925.5, 926.5, 927.5 | 12 |
| US | 902-928 | 26 | 902.5, . . . , 920.5, 921.5, 922.5, . . . , 927.5 | 26 |
| Singapore | 920-925 | 5 | 920.5, 921.5, 922.5, 923.5, 924.5 | 5 |

The channel assignment of Table 2 allows for the assignment of three common channels having respective carrier frequencies of 920.5, 921.5 and 922.5 MHz across the United States, Korea, Singapore and Japan. These common carrier frequencies are shown in bold in Table 2. This channelization allows for the maximum number of channels in Japan, United States and Singapore, but reduces the effective number of channels in Korea to 5.

The use of common channels as described herein permits two-step channel access procedures, as described in detail below. In some embodiments, a station desiring channel access first scans for beacons in common channels. If the station finds a beacon, it can identify its geographic region based on the beacon. After identifying the geographic region, the station can then scan all of the channels used in that geographic region. Before describing this process in detail, an example wireless network access system is described.

Figure 2:
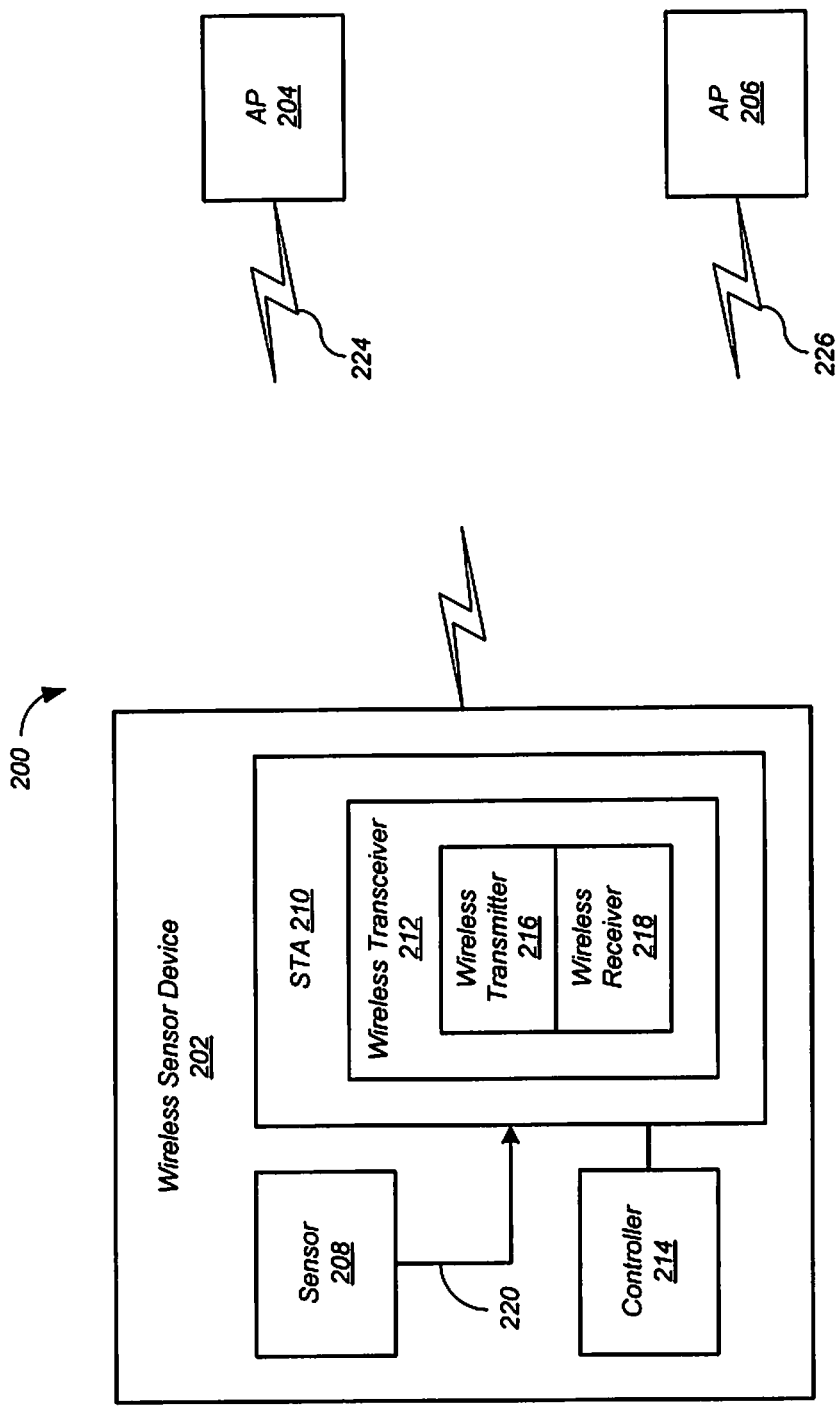
FIG. 2 shows a wireless network access system for a station according to some embodiments.

FIG. 2 shows a wireless network access system 200 for a station according to some embodiments. Although in the described embodiments the elements of the wireless network access system 200 are presented in one arrangement, other embodiments may feature other arrangements. For example, elements of the wireless network access system 200 can be implemented in hardware, software, or combinations thereof.

Referring to FIG. 2, the wireless network access system 200 includes a wireless sensor device 202, an access point (AP) 204 transmitting beacons 224 in a common channel, and an access point (AP) 206 transmitting beacons 226 in a regional channel (that is, a channel that is not common to multiple geographic regions). In the example of FIG. 2, the wireless network access system 200 is located in the United States, the access point 204 transmits in the 922 MHz channel of Table 1, and the access point 206 transmits in the 910 MHz channel of Table 1.

The wireless sensor device 202 includes a sensor 208 and a station (STA) 210. The station (STA) 210 includes a wireless transceiver 212 and a controller 214. The wireless transceiver 212 includes a wireless transmitter 216 and a wireless receiver 218. The sensor 208 provides sensor data 220 to the wireless transceiver 212 for transmission by the wireless transmitter 216 under the control of the controller 214. The sensor 208 can be any sort of sensor. In the present example, the sensor 208 is a thermometer, and the sensor data 220 is temperature data. The controller 214 can be implemented in any manner, for example as a microcontroller, processor, state machine, and the like. The wireless transceiver 212 and the controller 214 can be implemented as one or more integrated circuits. In some embodiments, all or part of the wireless network access system 200 is compliant with all or part of IEEE standard 802.11 ah, including draft and approved amendments.

Figure 3:
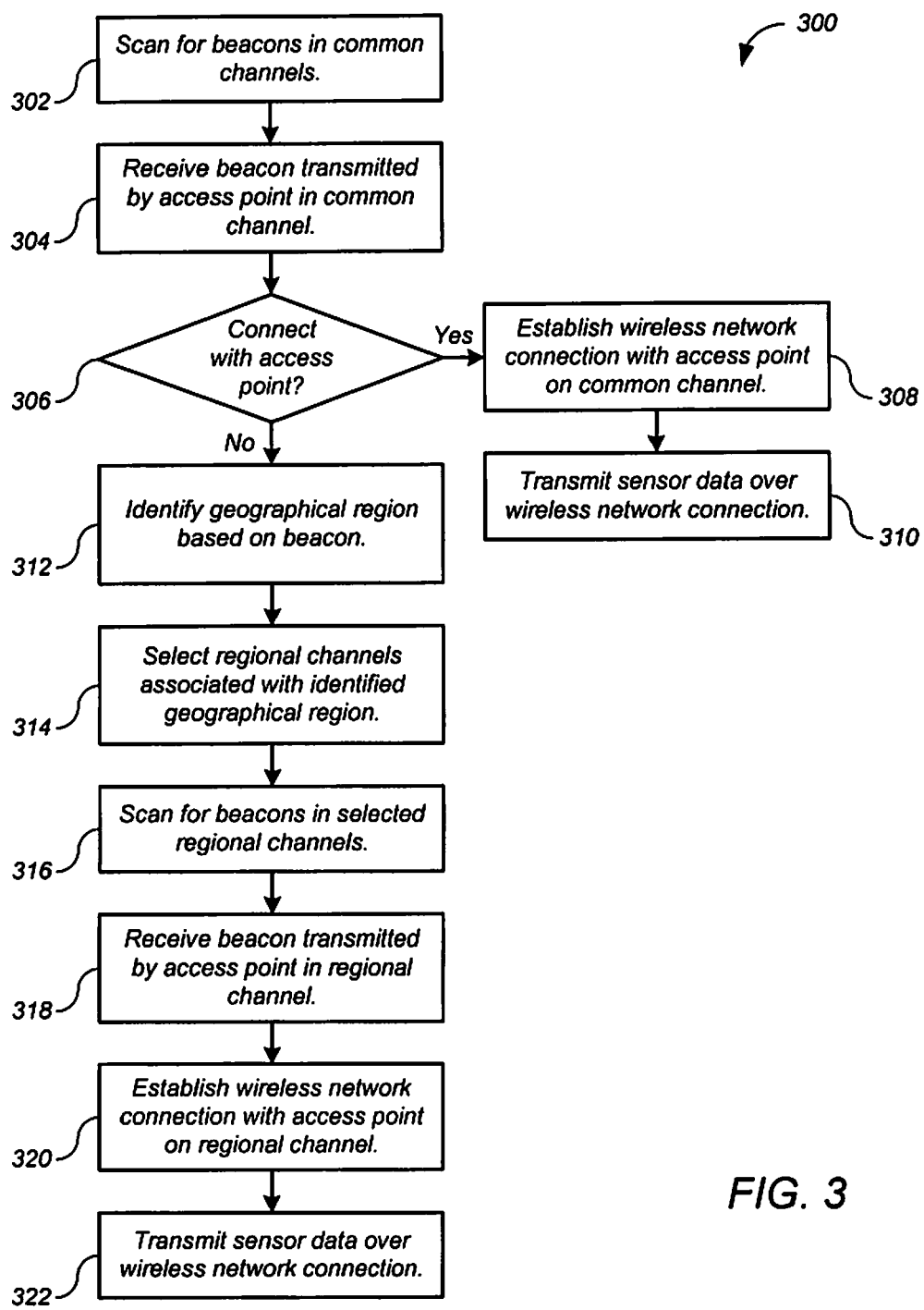
FIG. 3 shows a process for the wireless network access system of FIG. 2 according to some embodiments.

FIG. 3 shows a process 300 for the wireless network access system 200 of FIG. 2 according to some embodiments. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other. In addition, some or all of the elements of process 300 can be performed automatically, that is, without human intervention.

Referring to FIG. 3, at 302, the wireless receiver 218 scans for beacons in common channels, that is, in predetermined wireless channels that have the same carrier frequency in a plurality of different geographical regions. In the present example, the common channels are 921, 922 and 923 MHz, each of which has the same carrier frequency in the United States, Korea, Singapore and Japan. At 304, the wireless receiver 218 receives the beacon 224 transmitted by the access point 204 in a common channel. In the present example, the beacon 224 is transmitted by the access point 204 in the 922 MHz channel.

At 306, the controller 214 decides whether to connect with the access point 204 on the 922 MHz channel. This decision can be based on any criteria. If the controller 214 decides to connect with the access point 204 on the 922 MHz channel, then at 308, the wireless transceiver 212 establishes a wireless network connection with the access point 204 on the 922 MHz channel, and then, at 310, transmits the sensor data 220 over the 922 MHz channel.

On the other hand, if the controller 214 decides not to connect with the access point 204 on the 922 MHz channel, then at 312, the controller 214 identifies the geographical region in which the access point 204 is located based on the beacon 224 received from the access point 204. In the present example, the geographical region is the United States. In some embodiments, the controller 214 identifies the geographical region based on a geographical region element ID contained in the beacon 224 received from the access point 204. Then at 314, the controller 214 selects the regional channels associated with the identified geographical region. In the present example, referring to Table 1, the wireless channels are the 22 channels in the 903-920 MHz and 924-927 MHz bands. Then at 316, the wireless receiver 218 scans for beacons in the selected regional channels.

At 318, the wireless receiver 218 receives the beacon 226 transmitted by the access point 206 in a regional channel. In the present example, the beacon 226 is transmitted by the access point 206 in the 910 MHz channel. Then at 320, the wireless transceiver 212 establishes a wireless network connection with the access point 206 on the 910 MHz channel, and then, at 322, transmits the sensor data 220 over the 910 MHz connection.

Two-step wireless network establishment procedures can also be employed by access points and the like, as described in detail below. In some embodiments, an access point desiring to establish a wireless network such as a basic service set (BSS) first scans for beacons in common channels. If the access point finds a common channel having no beacons, the access point can establish a wireless network in that common channel. But if beacons are found in all of the common channels scanned, the access point can identify its geographic region based on one or more of the beacons. After identifying the geographic region, the access point can then scan all of the channels used in that geographic region. Before describing this process in detail, an example wireless network access system is described.

Figure 4:
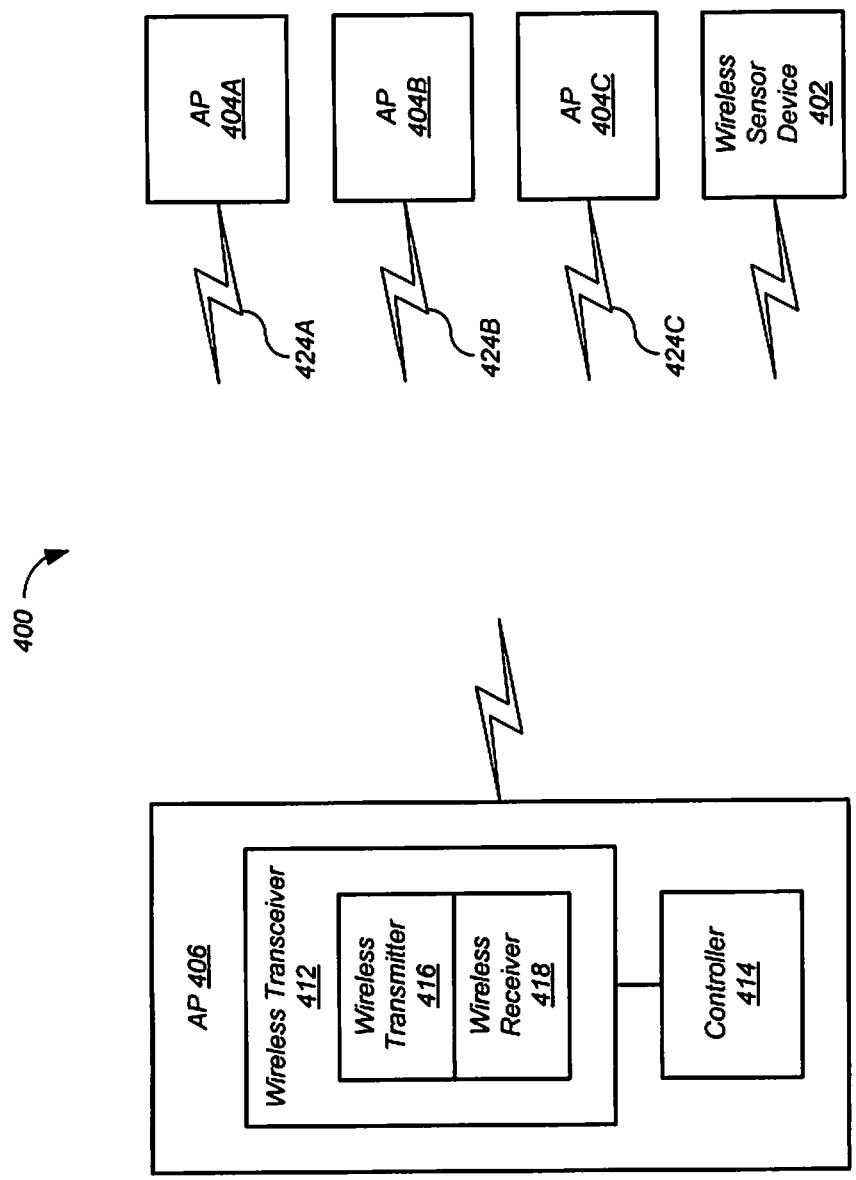
FIG. 4 shows a wireless network access system for an access point according to some embodiments.

FIG. 4 shows a wireless network access system 400 for an access point according to some embodiments. Although in the described embodiments the elements of the wireless network access system 400 are presented in one arrangement, other embodiments may feature other arrangements. For example, elements of the wireless network access system 400 can be implemented in hardware, software, or combinations thereof.

Referring to FIG. 4, the wireless network access system 400 includes a wireless sensor device 402 operating in a regional channel, three access points (AP) 404A, 404B, and 404C transmitting respective beacons 424A, 424B, and 424C in three respective common channels, and an access point (AP) 406 desiring to establish a wireless network. In the example of FIG. 4, referring to Table 1, the wireless network access system 400 is located in the United States, the access points 404A, 404B, and 404C are transmitting respective beacons 424A, 424B, and 424C in the 921, 922, and 923 MHz channels, respectively, and the wireless sensor device 402 is configured to operate in the 910 MHz channel. The wireless sensor device 402 can be implemented in a manner similar to that of the wireless sensor device 202 of FIG. 2.

The access point 406 includes a wireless transceiver 412 and a controller 414. The wireless transceiver 412 includes a wireless transmitter 416 and a wireless receiver 418. The controller 414 can be implemented in any manner, for example as a microcontroller, processor, state machine, and the like. The wireless transceiver 412 and the controller 414 can be implemented as one or more integrated circuits. In some embodiments, all or part of the wireless network access system 400 is compliant with all or part of IEEE standard 802.11ah, including draft and approved amendments.

Figure 5:
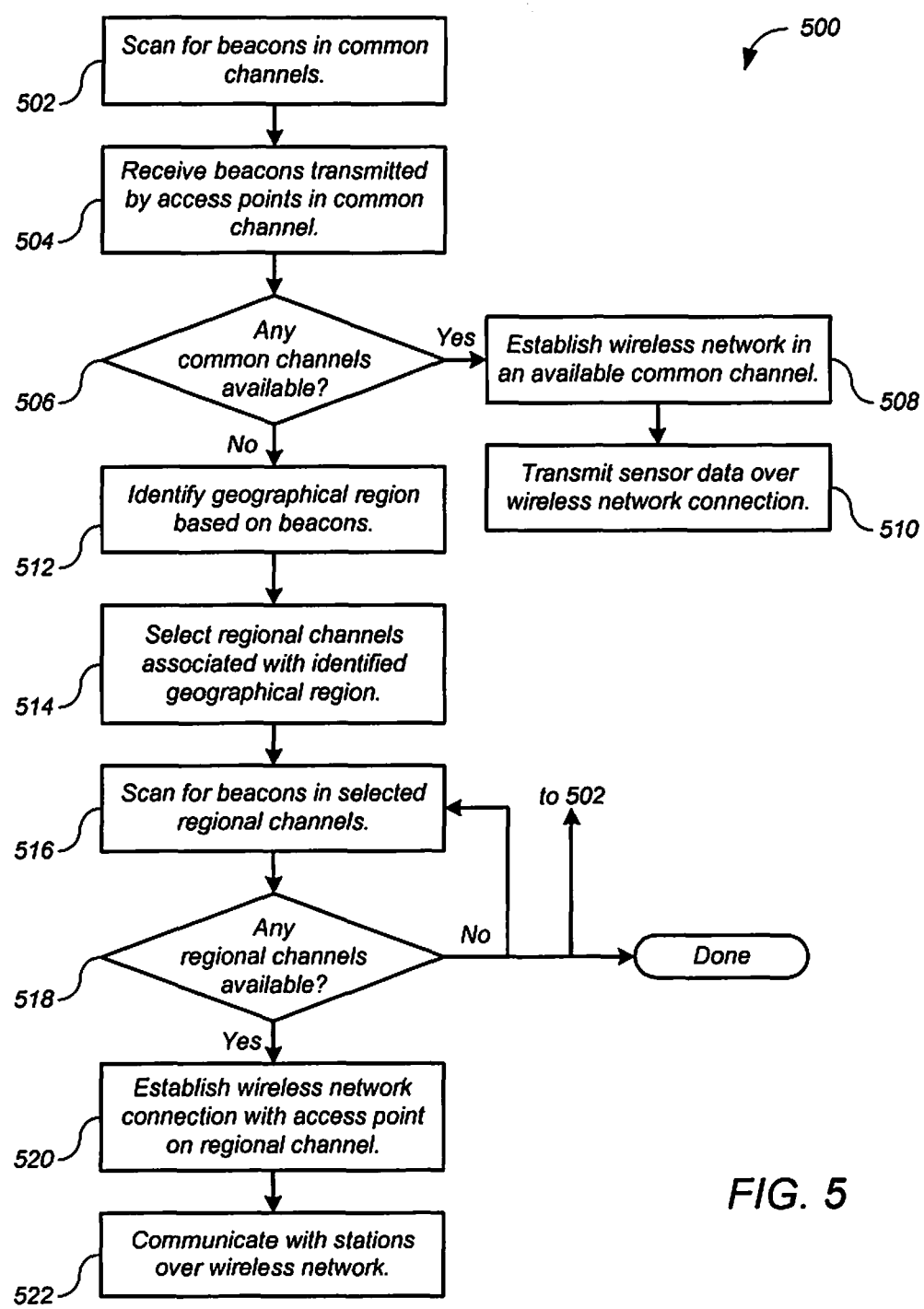
FIG. 5 shows a process for the wireless network access system 400 of FIG. 4 according to some embodiments.

FIG. 5 shows a process 500 for the wireless network access system 400 of FIG. 4 according to some embodiments. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the wireless receiver 418 scans for beacons in common channels, that is, in predetermined wireless channels that have the same carrier frequency in a plurality of different geographical regions. In the present example, the common channels are 921, 922 and 923 MHz, each of which has the same carrier frequency in the United States, Korea, Singapore and Japan. At 504, the wireless receiver 418 receives the beacons 424A, 424B, and 424C transmitted by the access points 404A, 404B, and 404C, respectively.

At 506, the controller 414 determines whether any of the scanned common channels are available. That is, the controller 414 determines whether wireless networks exist in the common channels. If any of the common channels are available, then at 508, the access point 406 can establish a wireless network in an available common channel. At 522, the access point 406 can communicate with stations over the wireless network.

On the other hand, if none of the common channels are available, then at 512, the controller 414 identifies the geographical region in which one or more of the access points 404 are located based on one or more of the beacons 424 received from the access points 404. In some embodiments, the controller 414 identifies the geographical region based on a geographical region element ID contained in a beacon 424 received from an access point 404. Then at 514, the controller 414 selects the regional channels associated with the identified geographical region. Then at 516, the wireless receiver 418 scans for beacons in the selected regional channels.

In the present example, none of the scanned common channels are available because each of the scanned common channels is in use by one of the access points 404. Also in the present example, the geographical region is the United States, and, referring to Table 1, the wireless channels are the 22 channels in the 903-920 MHz and 924-927 MHz bands.

At 518, the controller 414 determines whether any of the scanned regional channels are available. That is, the controller 414 determines whether wireless networks exist in the regional channels. If none of the regional channels are available, then the process can terminate or resume at 502 or at 516. But if any of the regional channels are available, then at 520, the access point 406 can establish a wireless network in one of the available regional channels. At 522, the access point 406 can communicate with stations over the wireless network.

In the present example, the controller 414 determines that the 910 MHz channel is available, and establishes a wireless network in that channel. Then the wireless transceiver 412 receives sensor data 220 from the wireless sensor device 402 over the 910 MHz connection, for example as described above.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:
1. An apparatus comprising:
a wireless receiver configured to scan for a first beacon in one or more of a first plurality of predetermined wireless channels, wherein each of the first plurality of predetermined wireless channels has the same carrier frequency in a plurality of different geographical regions; and
a controller configured to
(i) determine whether any of the first plurality of predetermined wireless channels are available,
(ii) responsive to determining that any of the first plurality of predetermined wireless channels are available, establish a wireless network in one of the first plurality of predetermined wireless channels, and
(iii) responsive to determining that none of the first plurality of predetermined wireless channels are available, identify, based on the first beacon scanned by the wireless receiver in the one or more of the first plurality of predetermined wireless channels, a first geographical region of the plurality of different geographical regions, select a second plurality of wireless channels associated with the first geographical region, scan for a second beacon in one or more of the second plurality of wireless channels selected by the controller, determine whether any of the second plurality of wireless channels are available, and establish the wireless network in one of the second plurality of wireless channels responsive to determining that any of the second plurality of wireless channels are available.

2. The apparatus of claim 1, further comprising:
a wireless transceiver, wherein the wireless transceiver comprises
the wireless receiver, and
a wireless transmitter,
wherein the wireless transceiver is configured to communicate in one of the second plurality of wireless channels.

3. One or more integrated circuits comprising the apparatus of claim 2.

4. A wireless communication device comprising:
the one or more integrated circuits of claim 3; and
a sensor configured to collect sensor data,
wherein the wireless transmitter is further configured to transmit the sensor data in the one of the second plurality of wireless channels.

5. The apparatus of claim 1, wherein the apparatus is compliant with all or part of IEEE standard 802.11ah, including draft and approved amendments.

6. The apparatus of claim 5, wherein:
the controller is further configured to identify the first geographical region based on a geographical region element ID contained in the first beacon scanned by the wireless receiver in one or more of the first plurality of predetermined wireless channels.

7. The apparatus of claim 1, wherein:
the first plurality of predetermined wireless channels have carrier frequencies at 921 MHz, 922 MHz, and 923 MHz.

8. The apparatus of claim 1, wherein:
the second plurality of wireless channels have carrier frequencies at 920.5 MHz, 921.5 MHz, and 922.5 MHz.

9. A method comprising:
scanning for a first beacon in one or more of a first plurality of predetermined wireless channels, wherein each of the first plurality of predetermined wireless channels has the same carrier frequency in a plurality of different geographical regions;

determining whether any of the first plurality of predetermined wireless channels are available, responsive to determining that any of the first plurality of predetermined wireless channels are available, establishing a wireless network in one of the first plurality of predetermined wireless channels, and responsive to determining that none of the first plurality of predetermined wireless channels are available, based on the first beacon scanned in one or more of the first plurality of predetermined wireless channels, identifying a first geographical region of the plurality of different geographical regions, selecting a second plurality of wireless channels associated with the first geographical region, scanning for a second beacon in one or more of the second plurality of wireless channels, determining whether any of the second plurality of wireless channels are available, and establishing the wireless network in one of the second plurality of wireless channels responsive to determining that any of the second plurality of wireless channels are available.

10. The method of claim 9, further comprising:
communicating in one of the second plurality of wireless channels.

11. The method of claim 10, further comprising:
collecting sensor data; and
transmitting the sensor data in the one of the second plurality of wireless channels.

12. The method of claim 9, wherein the method is compliant with all or part of IEEE standard 802.11ah, including draft and approved amendments.

13. The method of claim 12, wherein identifying the first geographical region comprises:
identifying the first geographical region based on a geographical region element ID contained in the first beacon scanned in one or more of the first plurality of predetermined wireless channels.

14. Non-transitory computer-readable media embodying instructions executable by a computer to perform functions comprising:
scanning for a first beacon in one or more of a first plurality of predetermined wireless channels, wherein each of the first plurality of predetermined wireless channels has the same carrier frequency in a plurality of different geographical regions;

determining whether any of the first plurality of predetermined wireless channels are available, responsive to determining that any of the first plurality of predetermined wireless channels are available, establishing a wireless network in one of the first plurality of predetermined wireless channels, and responsive to determining that none of the first plurality of predetermined wireless channels are available, based on the first beacon scanned in one or more of the first plurality of predetermined wireless channels, identifying a first geographical region of the plurality of different geographical regions, selecting a second plurality of wireless channels associated with the first geographical region, scanning for a second beacon in one or more of the second plurality of wireless channels, determining whether any of the second plurality of wireless channels are available, and establishing the wireless network in one of the second plurality of wireless channels responsive to determining that any of the second plurality of wireless channels are available.

15. The non-transitory computer-readable media of claim 14, wherein the functions further comprise:
communicating in one of the second plurality of wireless channels.

16. The non-transitory computer-readable media of claim 15, wherein the functions further comprise:
collecting sensor data; and
transmitting the sensor data in the one of the second plurality of wireless channels.

17. The non-transitory computer-readable media of claim 14, wherein the computer-readable media is compliant with all or part of IEEE standard 802.11ah, including draft and approved amendments.

\* \* \* \* \*